US011750106B2

(12) United States Patent
Chen et al.

(10) Patent No.: US 11,750,106 B2
(45) Date of Patent: Sep. 5, 2023

(54) H-BRIDGE GATE CONTROL APPARATUS

(71) Applicant: NuVolta Technologies (Hefei) Co., Ltd., Hefei (CN)

(72) Inventors: Junxiao Chen, Shanghai (CN); Gang Dai, Shanghai (CN); Jinbiao Huang, Nashua, NH (US)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 21 days.

(21) Appl. No.: 17/384,868

(22) Filed: Jul. 26, 2021

(65) Prior Publication Data

US 2021/0351625 A1  Nov. 11, 2021

Related U.S. Application Data

(62) Division of application No. 16/587,193, filed on Sep. 30, 2019, now Pat. No. 11,095,158.

(30) Foreign Application Priority Data

Sep. 23, 2019  (CN) .......................... 201910901564.5

(51) Int. Cl.
| | | |
|---|---|---|
| *H02J 50/12* | (2016.01) | |
| *H02M 7/219* | (2006.01) | |
| *H02M 7/5387* | (2007.01) | |
| *H02M 3/338* | (2006.01) | |
| *H02M 3/335* | (2006.01) | |
| *H02M 3/00* | (2006.01) | |

(52) U.S. Cl.
CPC .......... *H02M 3/3382* (2013.01); *H02J 50/12* (2016.02); *H02M 3/33573* (2021.05); *H02M 7/219* (2013.01); *H02M 7/5387* (2013.01); *H02M 3/01* (2021.05)

(58) Field of Classification Search
CPC .......... H02M 3/3382; H02M 3/33573; H02M 7/219; H02M 7/5387; H02M 3/01; H02M 1/0058; H02M 1/36; H02M 3/33592; H02M 1/088; H02M 3/33523
USPC ....................................................... 307/104
See application file for complete search history.

(56) References Cited

U.S. PATENT DOCUMENTS

| 10,199,877 B2 * | 2/2019 | Van Den Brink ...... H02J 7/007 |
| 2002/0044470 A1 * | 4/2002 | Hua ................... H02M 3/33592 363/127 |
| 2005/0156656 A1 | 7/2005 | Rotzoll et al. |
| 2006/0133116 A1 * | 6/2006 | Schaible ........... H02M 3/33592 363/17 |
| 2011/0254377 A1 | 10/2011 | Wildmer et al. |

(Continued)

*Primary Examiner* — Rexford N Barnie
*Assistant Examiner* — Thai H Tran
(74) *Attorney, Agent, or Firm* — AP3 Law Firm PLLC

(57) ABSTRACT

An apparatus includes a rectifier coupled to a coil of a wireless power transfer system, the rectifier comprising a first leg and a second leg, wherein the first leg comprises a first switch and a second switch connected in series between a first voltage bus and a second voltage bus, and the second leg comprise a third switch and a fourth switch connected in series between the first voltage bus and the second voltage bus, and wherein a gate drive signal of the first switch is derived from a signal in phase with a voltage on a first terminal of the coil, and a gate drive signal of the third switch is derived from a signal in phase with a voltage on a second terminal of the coil.

5 Claims, 13 Drawing Sheets

(56) References Cited

U.S. PATENT DOCUMENTS

| | | |
|---|---|---|
| 2015/0002081 A1 | 1/2015 | Lohr |
| 2015/0042274 A1* | 2/2015 | Kim .......................... H02J 7/06 |
| | | 320/108 |
| 2015/0146466 A1 | 5/2015 | Kim et al. |
| 2015/0381064 A1 | 12/2015 | Matsubara et al. |
| 2016/0043569 A1 | 2/2016 | Dally et al. |
| 2017/0005523 A1 | 1/2017 | Widmer et al. |
| 2017/0271924 A1 | 9/2017 | Mao et al. |

* cited by examiner

H-BRIDGE GATE CONTROL APPARATUS

PRIORITY CLAIM

This application is a divisional of U.S. patent application Ser. No. 16/587,193, filed on Sep. 30, 2019, which claims priority to Chinese Patent Application No. 201910901564.5, filed on Sep. 23, 2019, which is hereby incorporated by reference in its entirety.

TECHNICAL FIELD

The present invention relates to a gate drive control apparatus, and, in particular embodiments, to a gate drive control apparatus for an H-bridge in a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

As power consumption has become more important, there may be a need for high power density and high efficiency wireless power transfer systems. Resonant converter based wireless power transfer systems have become the preferred choice for achieving high performance (e.g., lower power losses) because resonant converters are capable of reducing switching losses of power switches through zero voltage switching and/or zero current switching. However, as the power of the wireless power transfer system goes higher, achieving a reliable and high efficiency power wireless power transfer system becomes a significant issue, which presents challenges to the system design of the wireless power transfer system.

It would be desirable to have a simple and reliable gate drive control apparatus to efficiently drive the receiver switching circuit as well as the transmitter switching circuit under a variety of operating conditions.

SUMMARY

These and other problems are generally solved or circumvented, and technical advantages are generally achieved, by preferred embodiments of the present disclosure which provide a gate control apparatus for driving an H-bridge switching circuit in a wireless power transfer system.

In accordance with an embodiment, an apparatus comprises a rectifier coupled to a coil of a wireless power transfer system, the rectifier comprising a first leg and a second leg, wherein the first leg comprises a first switch and a second switch connected in series between a first voltage bus and a second voltage bus, and the second leg comprise a third switch and a fourth switch connected in series between the first voltage bus and the second voltage bus, and wherein a gate drive signal of the first switch is derived from a signal in phase with a voltage on a first terminal of the coil, and a gate drive signal of the third switch is derived from a signal in phase with a voltage on a second terminal of the coil.

In accordance with another embodiment, a method comprises controlling a first high-side switch of an H-bridge using a first signal derived from a signal at a first terminal of an auxiliary coil, wherein a first midpoint and a second midpoint of the H-bridge are coupled to two terminals of a coil of a wireless power transfer system respectively, and the auxiliary coil is magnetically coupled to the coil, and controlling a second high-side switch of the H-bridge using a second signal derived from a signal at a second terminal of the auxiliary coil.

An advantage of an embodiment of the present disclosure is a simple and reliable gate control apparatus applied to an H-bridge switching circuit in a wireless power transfer system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a gate drive control apparatus for driving an H-bridge in a wireless power transfer system. The invention may also be applied, however, to a variety of power systems. Hereinafter, various embodiments will be explained in detail with reference to the accompanying drawings.

Figure 1:
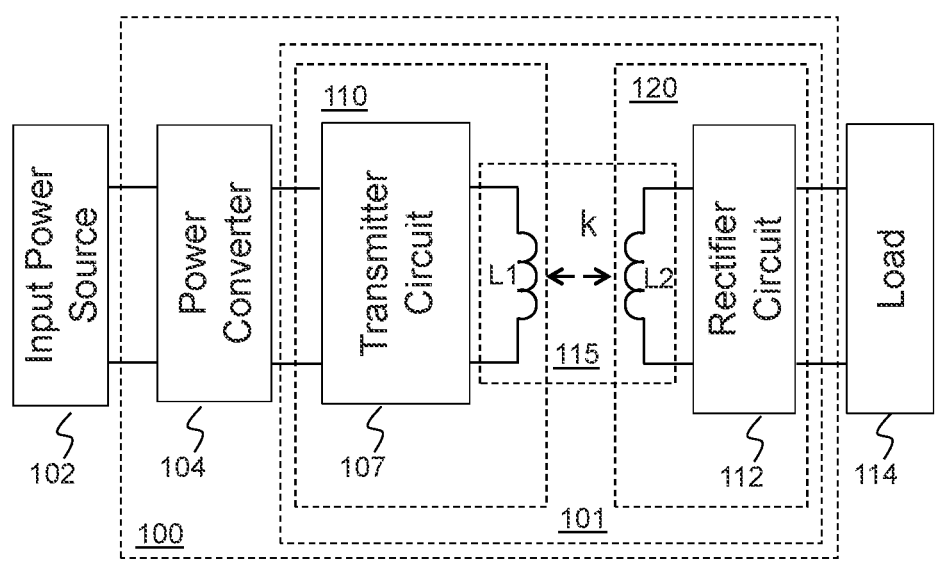
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. The wireless power transfer device 101 includes a power transmitter 110 and a power receiver 120. As shown in FIG. 1, the power transmitter 110 comprises a transmitter circuit 107 and a transmitter coil L1 connected in cascade. The input of the transmitter circuit 107 is coupled to an output of the power converter 104. The power receiver 120 comprises a receiver coil L2 and a rectifier 112 connected in cascade. The output of the rectifier 112 is coupled to the load 114.

The power transmitter 110 is magnetically coupled to the power receiver 120 through a magnetic field when the power receiver 120 is placed near the power transmitter 110. A loosely coupled transformer 115 is formed by the transmitter coil L1, which is part of the power transmitter 110, and the receiver coil L2, which is part of the power receiver 120. As a result, power may be transferred from the power transmitter 110 to the power receiver 120.

In some embodiments, the power transmitter 110 may be inside a charging pad. The transmitter coil is placed underneath the top surface of the charging pad. The power receiver 120 may be embedded in a mobile phone. When the mobile phone is place near the charging pad, a magnetic coupling may be established between the transmitter coil and the receiver coil. In other words, the transmitter coil and the receiver coil may form a loosely coupled transformer through which a power transfer occurs between the power transmitter 110 and the power receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the power transmitter 110 and the power receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be an energy storage device such as rechargeable batteries, fuel cells and/or the like.

The load 114 represents the power consumed by the mobile device (e.g., a mobile phone) coupled to the power receiver 120. Alternatively, the load 114 may refer to a rechargeable battery and/or batteries connected in series/parallel, and coupled to the output of the power receiver 120.

The transmitter circuit 107 may comprise primary side switches of a full-bridge converter according to some embodiments. The full-bridge is also known as an H-bridge. Alternatively, the transmitter circuit 107 may comprise the primary side switches of other converters such as a half-bridge converter, a push-pull converter and the like. The detailed configuration of the transmitter circuit 107 will be described below with respect to FIG. 2.

It should be noted that the converters described above are merely examples. One having ordinary skill in the art will recognize other suitable power converters such as class E topology based power converters (e.g., a class E amplifier), may alternatively be used.

The transmitter circuit 107 may further comprise a resonant capacitor. The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The power receiver 120 comprises the receiver coil L2 magnetically coupled to the transmitter coil L1 after the power receiver 120 is placed near the power transmitter 110. As a result, power may be transferred to the receiver coil and further delivered to the load 114 through the rectifier 112. The power receiver 120 may comprise a secondary resonant capacitor.

The rectifier 112 converts an alternating polarity waveform received from the output of the receiver coil L2 to a single polarity waveform. In some embodiments, the rectifier 112 is implemented as a synchronous rectifier including four switches. The synchronous rectifier is also known as an H-bridge. In alternative embodiments, the rectifier 112 comprises a full-wave diode bridge and an output capacitor.

Furthermore, the synchronous rectifier may be formed by any controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed structure of the rectifier 112 will be discussed below with respect to FIG. 2.

The power converter 104 is coupled between the input power source 102 and the input of the wireless power transfer device 101. Depending design needs and different applications, the power converter 104 may comprise many different configurations. In some embodiments, the power converter 104 may be a non-isolated power converter such as a buck converter. In some embodiments, the power converter 104 may be implemented as a linear regulator. In some embodiments, the power converter 104 may be an isolated power converter such as a forward converter.

The implementation of the power converter 104 described above is merely an example, which should not unduly limit the scope of the claims. One of ordinary skill in the art would recognize many variations, alternatives, and modifications.

Figure 2:
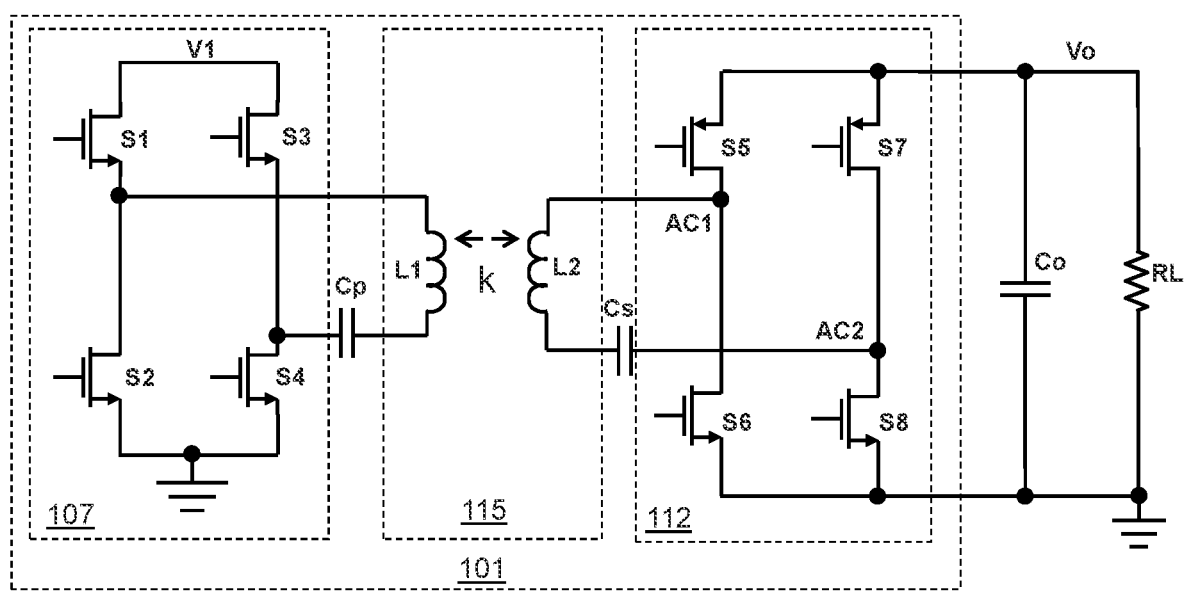
FIG. 2 illustrates a schematic diagram of the wireless power transfer system shown in FIG. 1 in accordance with various embodiments of the present disclosure.

FIG. 2 illustrates a schematic diagram of the wireless power transfer system shown in FIG. 1 in accordance with various embodiments of the present disclosure. The wireless power transfer device 101 comprises a transmitter circuit 107, a resonant capacitor Cp, a loosely coupled transformer 115, a resonant capacitor Cs and a rectifier 112 connected in cascade. The loosely coupled transformer 115 is formed by the transmitter coil L1 and the receiver coil L2. The transmitter circuit 107 is implemented as a full-bridge as shown in FIG. 2. Throughout the description, the transmitter circuit 107 may be alternatively referred to as a full-bridge.

The full-bridge 107 includes four switching elements, namely S1, S2, S3 and S4. As shown in FIG. 2, the switching elements S1 and S2 are connected in series between an input voltage bus V1 and ground. The input voltage bus V1 is connected to the output of the power converter 104 shown in FIG. 1. Likewise, the switching elements S3 and S4 are connected in series between the input voltage bus V1 and ground. The common node of the switching elements S1 and S2 is coupled to a first input terminal of the transmitter coil L1. The common node of the switching elements S3 and S4 is coupled to a second input terminal of the transmitter coil L1 through the resonant capacitor Cp.

According to some embodiments, the switching elements S1, S2, S3 and S4 are implemented as MOSFET or MOSFETs connected in parallel, any combinations thereof and/or the like. According to alternative embodiments, the switching elements (e.g., switch S1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full-bridge converter (e.g., full-bridge 107 shown in FIG. 2), the implementation of the transmitter circuit 107 shown in FIG. 2 may have many variations, alternatives, and modifications. For example, half-bridge converters, push-pull converters, class E based power converters (e.g., a class E amplifier) may be alternatively employed. Furthermore, an inductor-inductor-capacitor (LLC) resonant converter may be formed when the transmitter coil L1 is tightly coupled with the receiver coil L2 in some applications.

In sum, the full-bridge 107 illustrated herein is limited solely for the purpose of clearly illustrating the inventive aspects of the various embodiments. The present invention is not limited to any particular power topology.

It should further be noted that while FIG. 2 illustrates four switches S1-S4, various embodiments of the present disclosure may include other variations, modifications and alternatives. For example, a separate capacitor may be connected in parallel with each switch of the full-bridge 107. Such a separate capacitor helps to better control the timing of the resonant process of the full-bridge 107.

The outputs of the receiver coil L2 are coupled to the load RL through the resonant capacitor Cs, the rectifier 112 and a capacitor Co. The rectifier converts an alternating polarity waveform received from the outputs of the receiver coil L2 to a single polarity waveform. The capacitor Co is employed to attenuate noise and provide a steady output voltage. The resonant capacitor Cs helps to achieve soft switching for the wireless power transfer system.

In some embodiments, the rectifier 112 is implemented as a synchronous rectifier. The rectifier 112 includes four switching elements, namely S5, S6, S7 and S8. As shown in FIG. 2, the switching elements S5 and S6 are connected in series between the output terminal of the rectifier 112 and ground. Likewise, the switching elements S7 and S8 are connected in series between the output terminal of the rectifier 112 and ground. As shown in FIG. 2, the common node AC1 of the switching elements S5 and S6 is coupled to a first terminal of the receiver coil L2. The common node AC2 of the switching elements S7 and S8 is coupled to a second terminal of the receiver coil L2 through the resonant capacitor Cs. Throughout the description, the rectifier 112 may be alternatively referred to as an H-bridge. The node AC1 may be alternatively referred to as a first midpoint of the H-bridge. The node AC2 may be alternatively referred to as a second midpoint of the H-bridge. The switches S5 and S7 are alternatively referred to as high-side switches. The switches S6 and S8 are alternatively referred to as low-side switches.

According to some embodiments, the switching elements S5, S6, S7 and S8 are implemented as MOSFET or MOSFETs connected in parallel, any combinations thereof and/or the like. In particular, S5 and S7 are implemented as p-type transistors as shown in FIG. 2. S6 and S8 are implemented as n-type transistor as shown in FIG. 2.

Figure 3:
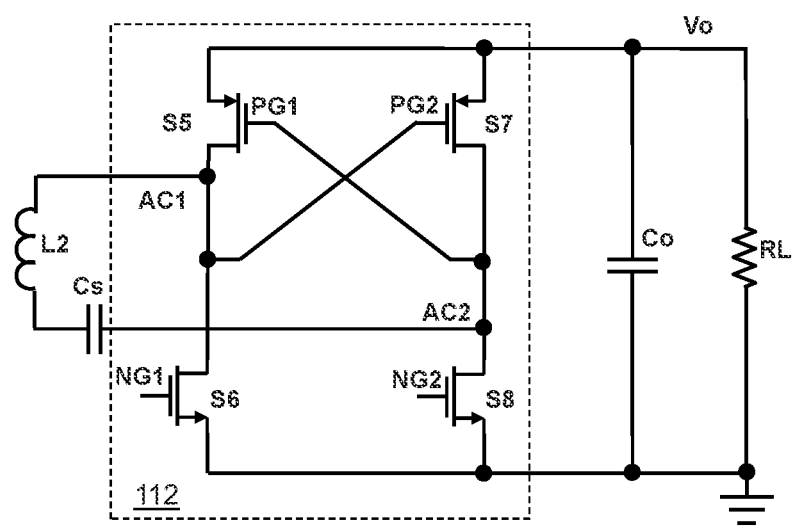
FIG. 3 illustrates a first implementation of a gate control mechanism of the rectifier shown in FIG. 2 in accordance with various embodiments of the present disclosure.

FIG. 3 illustrates a first implementation of a gate control mechanism of the rectifier shown in FIG. 2 in accordance with various embodiments of the present disclosure. As shown in FIG. 3, the gate (PG1) of the switch S5 is connected to the node AC2 directly. The gate (PG2) of the switch S7 is connected to the node AC1 directly. The gate (NG1) of switch S6 and the gate (NG2) of switch S8 are controlled by a PWM controller through suitable gate drive circuits (not shown). The detailed operating principle of the gate control mechanism shown in FIG. 3 will be described in detail with respect to FIG. 4.

One advantageous feature of having the gate control mechanism shown in FIG. 3 is the self-driving circuit can simplify the driver circuit of the wireless power transfer system. More particularly, by employing the gate control mechanism shown in FIG. 3, the high-side drivers can be eliminated, thereby reducing the cost and improving the reliability of the wireless power transfer system.

Figure 4:
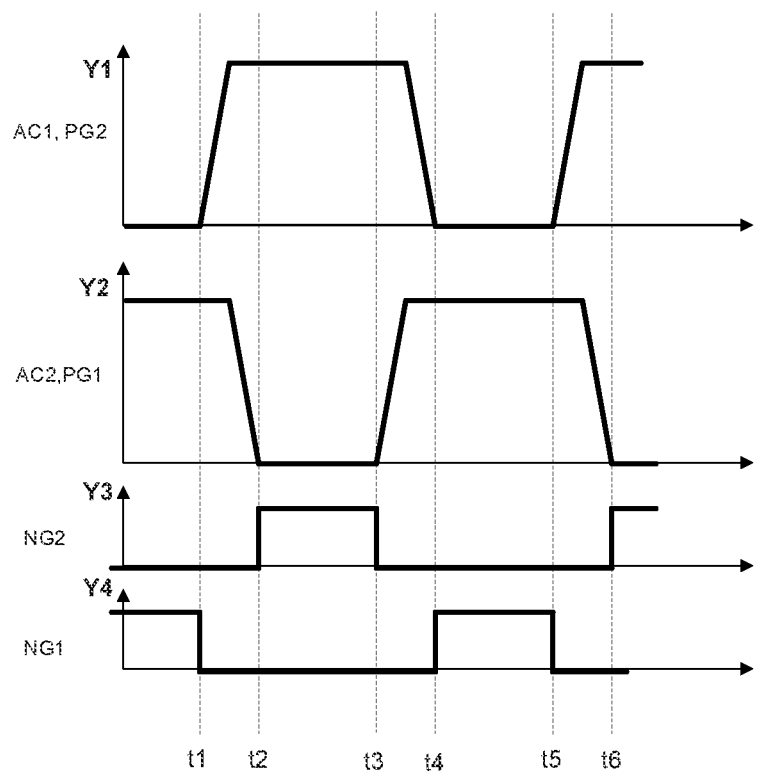
FIG. 4 is a gate control chart illustrating the operating principle of the gate control mechanism shown in FIG. 3 in accordance with various embodiments of the present disclosure.

FIG. 4 is a gate control chart illustrating the operating principle of the gate control mechanism shown in FIG. 3 in accordance with various embodiments of the present disclosure. The horizontal axis of FIG. 4 represents intervals of time. There are four vertical axes. The first vertical axis Y1 represents the voltage at the node AC1, which is applied to PG2 directly as shown in FIG. 3. The second vertical axis Y2 represents the voltage at the node AC2, which is applied to PG1 directly as shown in FIG. 3. The third vertical axis Y3 represents the gate drive signal NG2. The fourth vertical axis Y4 represents the gate drive signal NG1.

Prior to the time instant t1, both switches S6 and S7 are turned on, and switches S5 and S8 are turned off as indicated by the gate drive signals NG1, PG2, PG1 and NG2, respectively. At t1, the gate drive signal NG1 changes from a logic high state to a logic low state. In response to this change, the switch S6 is turned off. As a result of turning off the switch S6, the voltage at the node AC1 increases accordingly. During the time period from t1 to t2, as the voltage of PG2 increases, the switch S7 is turned off after PG2 increases to a voltage level greater than the turn-off threshold of the switch S7. Likewise, as the voltage of PG1 decreases, the switch S5 is turned on after PG1 decreases to a voltage level less than the turn-on threshold of the switch S5.

At t2, the gate drive signal NG2 changes from a logic low state to a logic high state. In response to this change, switch S8 is turned on. During the time period from t2 to t3, both switches S6 and S7 are turned off, and switches S5 and S8 are turned on as indicated by the gate drive signals NG1, PG2, PG1 and NG2, respectively.

At t3, the gate drive signal NG2 changes from a logic high state to a logic low state. In response to this change, switch S8 is turned off. As a result of turning off the switch S8, the voltage at the node AC2 increases accordingly. During the time period from t3 to t4, as the voltage of PG1 increases, the switch S5 is turned off after PG1 increases to a voltage level greater than the turn-off threshold of the switch S5. Likewise, as the voltage of PG2 decreases, the switch S7 is turned on after PG2 decreases to a voltage level less than the turn-on threshold of the switch S7.

At t4, the gate drive signal NG1 changes from a logic low state to a logic high state. In response to this change, switch S6 is turned on. During the time period from t4 to t5, both switches S6 and S7 are turned on, and switches S5 and S8 are turned off as indicated by the gate drive signals NG1, PG2, PG1 and NG2, respectively.

During the time period from t5 to t6, the on/off status of the gate drive signals is similar to that of the gate drive signals during the time period from t1 to t2, and hence is not discussed in detail again to avoid repetition.

FIG. 4 shows the gate control mechanism shown in FIG. 3 is able to control the rectifier 112 so as to convert an alternating polarity waveform received from the output of the receiver coil L2 to a single polarity waveform. Furthermore, the synchronous operation of the rectifier 112 helps to improve the efficiency of the wireless power transfer system.

Figure 5:
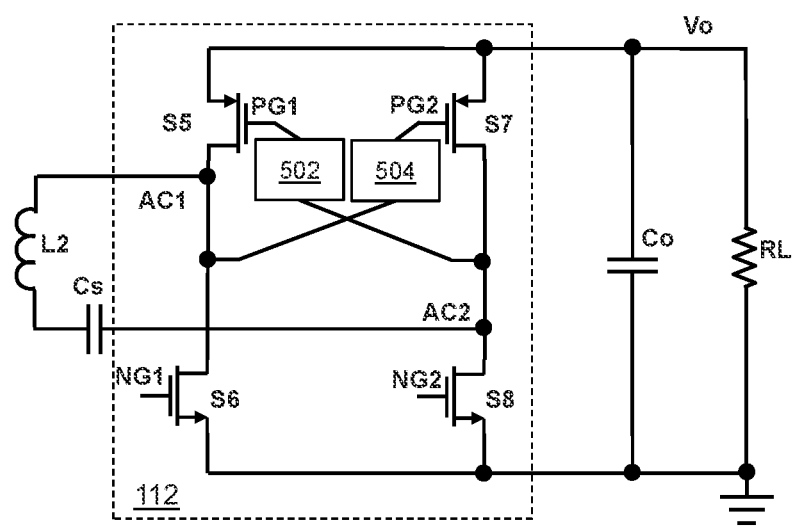
FIG. 5 illustrates a second implementation of the gate control mechanism of the rectifier shown in FIG. 2 in accordance with various embodiments of the present disclosure.

FIG. 5 illustrates a second implementation of the gate control mechanism of the rectifier shown in FIG. 2 in accordance with various embodiments of the present disclosure. As shown in FIG. 5, the gate (PG1) of the switch S5 is connected to node AC2 through a first gate control circuit 502. The gate (PG2) of switch S7 is connected to the node AC1 through a second gate control circuit 504. The gate (NG1) of switch S6 and the gate (NG2) of switch S8 are controlled by a PWM controller through suitable gate drive circuits (not shown).

In some embodiments, the first gate control circuit 502 is implemented as a first timing circuit. For example, the first gate control circuit 502 may comprise a resistor-capacitor delay circuit. The resistor-capacitor delay circuit is employed to apply a first timing delay to the gate drive signal of the switch S5. Likewise, the second gate control circuit 504 is implemented as a second timing circuit. For example, the second gate control circuit 504 may comprise a resistor-capacitor delay circuit. The resistor-capacitor delay circuit is employed to apply a second timing delay to the gate drive signal of the switch S7.

In alternative embodiments, the first gate control circuit 502 is implemented as a first decision-making circuit. For example, the first gate control circuit 502 may comprise a disable/enable circuit. The disable/enable circuit is employed to control the operation of the switch S5. In particular, when the disable/enable circuit is enabled, the switch S5 operates in a synchronous rectifier mode. When the disable/enable circuit is disabled, the switch S5 operates in a diode mode. Likewise, the second gate control circuit 504 is implemented as a second decision-making circuit. The operation principle of the second decision-making circuit is similar to that of the first decision-making circuit, and hence is not discussed again herein to avoid repetition.

Figure 6:
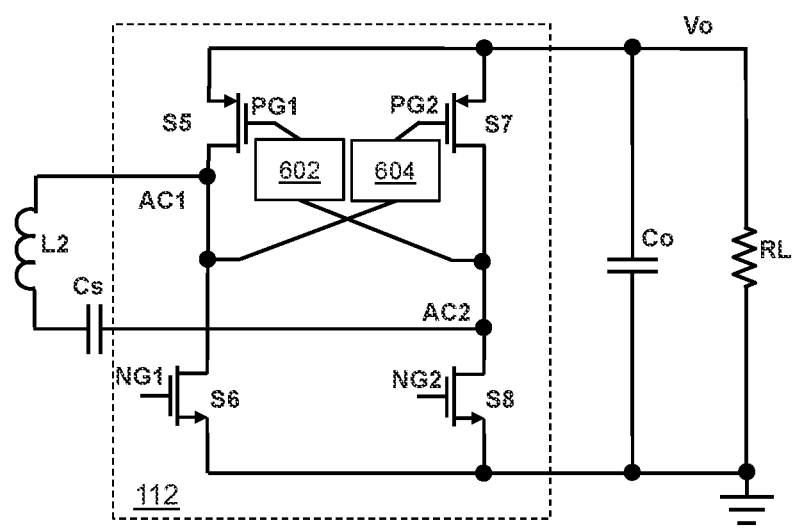
FIG. 6 illustrates a third implementation of the gate control mechanism of the rectifier shown in FIG. 2 in accordance with various embodiments of the present disclosure.

FIG. 6 illustrates a third implementation of the gate control mechanism of the rectifier shown in FIG. 2 in accordance with various embodiments of the present disclosure. As shown in FIG. 6, the gate (PG1) of switch S5 is connected to the node AC2 through a first voltage clamping circuit 602. The gate (PG2) of switch S7 is connected to the node AC1 through a second voltage clamping circuit 604. The gate (NG1) of switch S6 and the gate (NG2) of switch S8 are controlled by a PWM controller through suitable gate drive circuits (not shown).

In some embodiments, the first voltage clamping circuit 602 is implemented as a suitable voltage clamping device for preventing a high voltage stress applied to the gate and source of the switch S5. For example, the first voltage clamping circuit 602 may be implemented as a linear regulator. The voltage stress applied to the gate and source of the switch S5 can be adjusted through varying the voltage drop across the linear regulator. Likewise, the second voltage clamping circuit 604 is implemented as a suitable voltage clamping device for preventing a high voltage stress applied to the gate and source of the switch S7. For example, the second voltage clamping circuit 604 may be implemented as a linear regulator. The voltage stress applied to the gate and source of the switch S7 can be adjusted through varying the voltage drop across the linear regulator.

Figure 7:
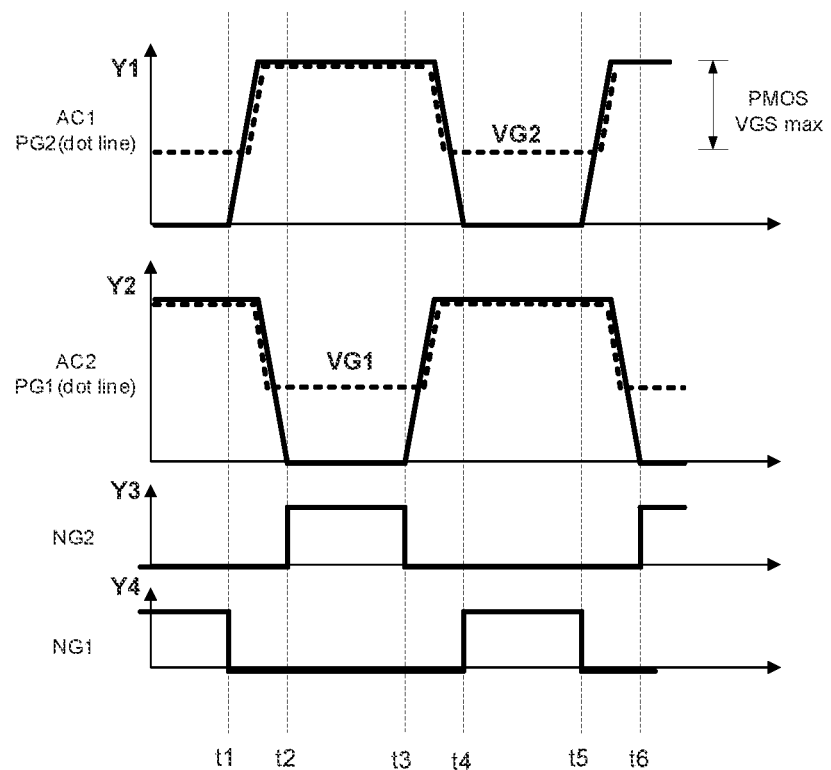
FIG. 7 is a gate control chart illustrating the operating principle of the gate control mechanism shown in FIG. 6 in accordance with various embodiments of the present disclosure.

FIG. 7 is a gate control chart illustrating the operating principle of the gate control mechanism shown in FIG. 6 in accordance with various embodiments of the present disclosure. The horizontal axis of FIG. 7 represents intervals of time. There are four vertical axes. The first vertical axis Y1 represents the voltage at the node AC1, which is applied to PG2 directly. The second vertical axis Y2 represents the voltage at the node AC2, which is applied to PG1 directly. The third vertical axis Y3 represents the gate drive signal NG2. The fourth vertical axis Y4 represents the gate drive signal NG1.

The gate drive signals NG1, NG2, PG1 and PG2 shown in FIG. 7 are similar to the gate drive signals shown in FIG. 4 except that the lowest voltages of PG1 and PG2 are clamped to a predetermined voltage level. As shown in FIG. 7, during the time period from t2 to t3, the voltage at the node AC2 is equal to zero. In contrast, the voltage of PG1 is clamped to a first predetermined voltage VG1. Likewise, during the time period from t4 to t5, the voltage at the node AC1 decreases to zero. In contrast, the voltage of PG2 is clamped to a second predetermined voltage VG2. In some embodiments, the first predetermined voltage VG1 is equal to the second predetermined voltage VG2. In alternative embodiments, the first predetermined voltage VG1 may be different from the second predetermined voltage VG2.

Figure 8:
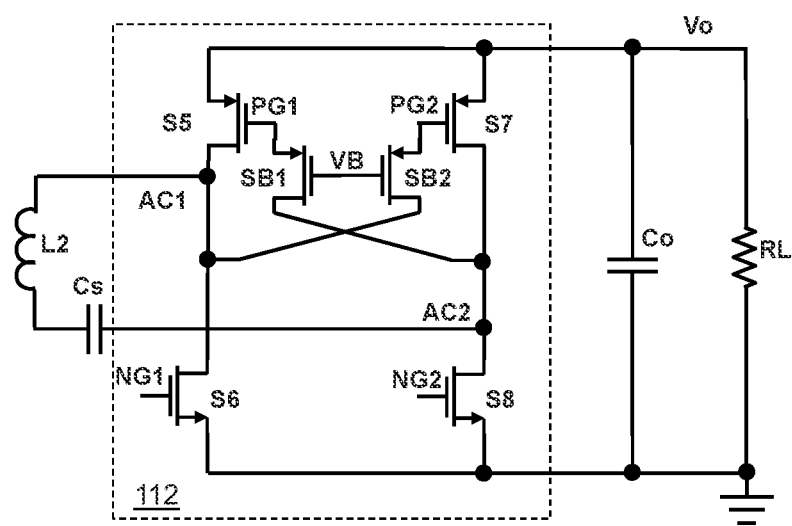
FIG. 8 illustrates a schematic diagram of a first implementation of the linear regulators shown in FIG. 6 in accordance with various embodiments of the present disclosure.

FIG. 8 illustrates a schematic diagram of a first implementation of the linear regulators shown in FIG. 6 in accordance with various embodiments of the present disclosure. The first voltage clamping circuit 602 shown in FIG. 6 is implemented as a first linear regulator. As shown in FIG. 8, the first linear regulator is a first p-type transistor SB1 connected between the gate (PG1) of the switch S5 and the node AC2. Likewise, the second voltage clamping circuit 604 shown in FIG. 6 is implemented as a second linear regulator. As shown in FIG. 8, the second linear regulator is a second p-type transistor SB2 connected between the gate (PG2) of the switch S7 and the node AC1.

As shown in FIG. 8, the gate of the first p-type transistor SB1 and the gate of the second p-type transistor SB2 are connected together and further connected to a predetermined bias voltage source VB. In operation, by varying the output voltage of the predetermined bias voltage source VB, the voltage stress across the gate and source of the switches S5 and S7 can be adjusted accordingly.

In some embodiments, the predetermined bias voltage source VB is an adjustable voltage source. In operation, during a startup process, the voltage level of the predetermined bias voltage source VB may be slowly reduced so that the switches S5 and S7 are slowly turned on. As a result, the output voltage Vo can be established smoothly. In alternative embodiments, the voltage level of the predetermined bias voltage source VB may be adjusted dynamically so that the voltage drops across the switches S5 and S7 can vary. The variations of the voltage drops across the switches S5 and S7 can be used to regulate the output voltage Vo.

Figure 9:
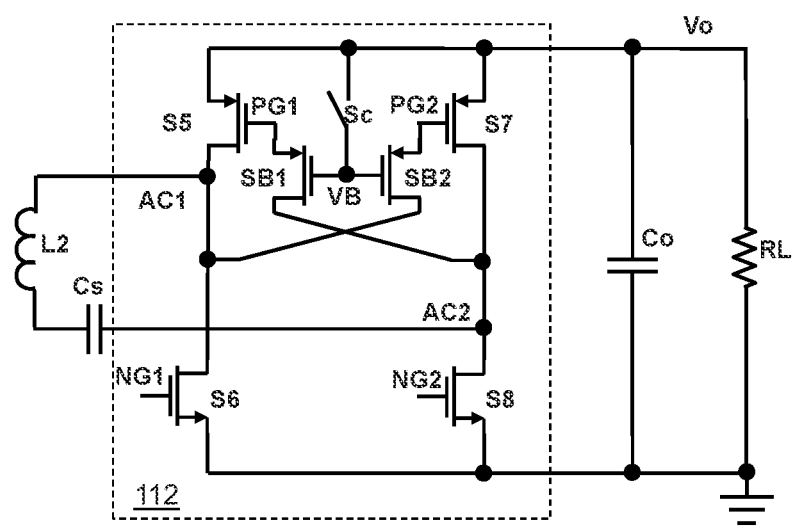
FIG. 9 illustrates a schematic diagram of a second implementation of the linear regulators shown in FIG. 6 in accordance with various embodiments of the present disclosure.

FIG. 9 illustrates a schematic diagram of a second implementation of the linear regulators shown in FIG. 6 in accordance with various embodiments of the present disclosure. The implementation of the linear regulators shown in FIG. 9 is similar to that shown in FIG. 8 except that the predetermined bias voltage source VB is connected to the output voltage Vo through a switch Sc as shown in FIG. 9. In operation, when the switch Sc is closed, both the gate of the switch S5 and the gate of the switch S7 are pulled up to a high voltage. As a result, the switches S5 and S7 are disabled. The switches S5 and S7 operate in a diode mode. On the other hand, when the switch Sc is open, the operation of the linear regulators is similar to that shown in FIG. 8.

Figure 10:
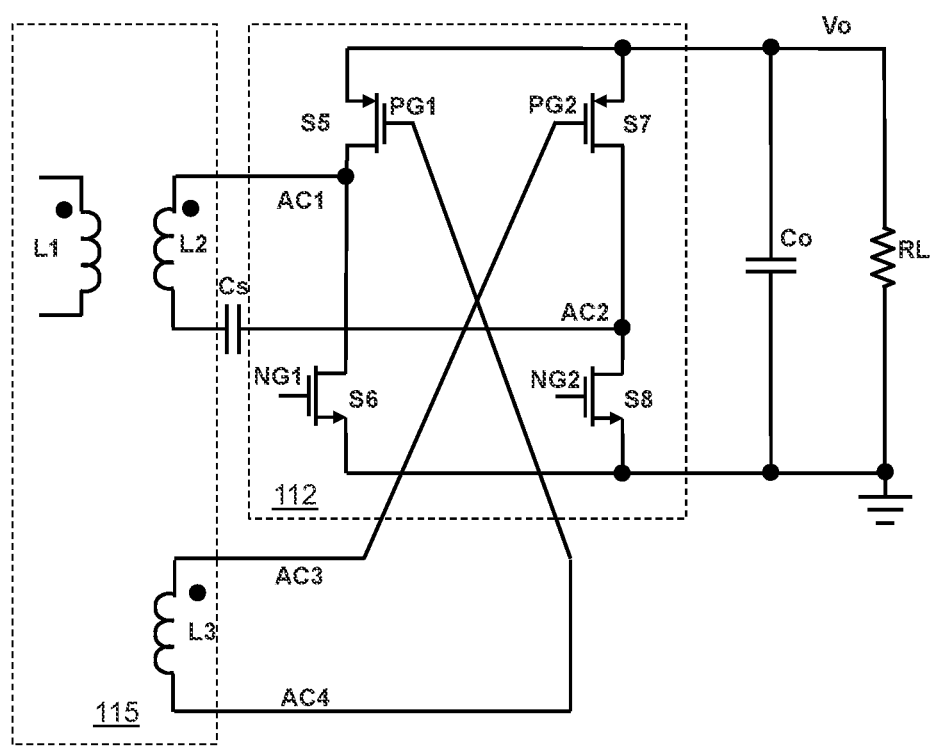
FIG. 10 illustrates a fourth implementation of the gate control mechanism of the rectifier shown in FIG. 2 in accordance with various embodiments of the present disclosure.

FIG. 10 illustrates a fourth implementation of the gate control mechanism of the rectifier shown in FIG. 2 in accordance with various embodiments of the present disclosure. The gate control mechanism shown in FIG. 10 is similar to that shown in FIG. 3 except that an auxiliary coil is employed to further improve the drive circuits of the switches S5 and S7.

As shown in FIG. 10, the auxiliary coil L3 is magnetically coupled to the transmitter coil L1 and the receiver coil L2. The dot of each coil denotes the polarity of the coil. Based on the dots of coils L2 and L3, the voltage on the node AC3 has the same phase as the voltage on the node AC1 Likewise, the voltage on the node AC4 has the same phase as the voltage on the node AC2. The auxiliary coil L3 can be used to drive the switches S5 and S7 directly. As shown in FIG. 10, the gate (PG1) of switch S5 is connected to the node AC4 directly. The gate (PG2) of switch S7 is connected to the node AC3 directly. In comparison with the embodiment shown in FIG. 3, the number of turns of the auxiliary coil L3 can be selected such that suitable gate drive voltages are applied to PG1 and PG2 respectively. For example, in a high voltage receiver, the voltages generated by the receiver coil L2 are not suitable for driving PG1 and PG2 directly. The auxiliary coil L3 can be designed to generate lower voltages for driving PG1 and PG2 directly.

It should be noted that the embodiments shown in FIGS. 5-9 can be combined with the auxiliary coil shown in FIG. 10. For example, the resistor-capacitor delay circuits shown in FIG. 5 may be employed in FIG. 10. In particular, a first resistor-capacitor delay circuit may be connected between the node AC4 and the gate PG1. A second resistor-capacitor delay circuit may be connected between the node AC3 and the gate PG2.

Figure 11:
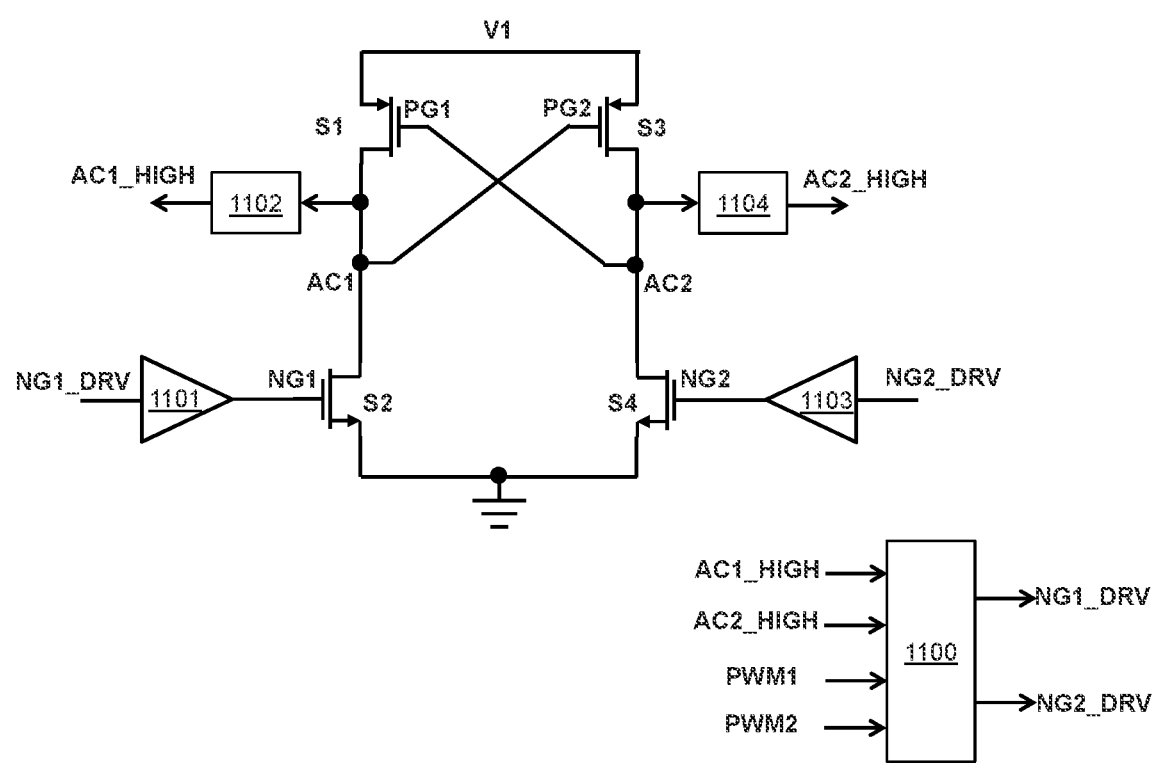
FIG. 11 illustrates a gate control mechanism of the switching circuit of the transmitter shown in FIG. 2 in accordance with various embodiments of the present disclosure.

FIG. 11 illustrates a gate control mechanism of the switching circuit of the transmitter shown in FIG. 2 in accordance with various embodiments of the present disclosure. The switching circuit of the transmitter is implemented as an H-bridge. The H-bridge includes switches S1 and S2 connected in series between a voltage bus V1 and ground, and switches S3 and S4 connected in series between the voltage bus V1 and ground. As shown in FIG. 11, the switches S1 and S3 are implemented as p-type transistors. The switches S2 and S4 are implemented as n-type transistors.

The gate (PG1) of the switch S1 is connected to the node AC2 directly. Likewise, the gate (PG2) of the switch S3 is connected to the node AC1 directly. A first sensing device 1102 is employed to detect the voltage level of the node AC1. The first sensing device 1102 generates a signal AC1_HIGH. The signal AC1_HIGH is a logic high signal when the voltage level of the node AC1 is close to the voltage on the voltage bus V1. The first sensing device 1102 may be implemented as any suitable voltage sensing devices. A second sensing device 1104 is employed to detect the voltage level of the node AC2. The second sensing device 1104 generates a signal AC2_HIGH. The signal AC2_HIGH is a logic high signal when the voltage level of the node AC2 is close to the voltage on the voltage bus V1. The second sensing device 1104 may be implemented as any suitable voltage sensing devices.

A controller 1100 is employed to generate gate drive signals NG1_DRV and NG2_DRV based on signals PWM1, PWM2, AC1_HIGH and AC2_HIGH. The detailed operating principle of the controller 1100 will be described below with respect to FIGS. 12-13. As shown in FIG. 11, the gate drive signal NG1_DRV is fed into a first buffer 1101. The first buffer 1101 generates a gate drive signal NG1 applied to the gate of the switch S2. The gate drive signal NG2_DRV is fed into a second buffer 1103. The second buffer 1103 generates a gate drive signal NG2 applied to the gate of the switch S4.

In operation, a system controller (not shown) generates gate drive signals PWM1 and PWM2 for driving switches S2 and S4, respectively. The sensing devices 1102 and 1104 detect the voltage levels at nodes AC1 and AC2 respectively. The detected signals AC1_HIGH and AC2_HIGH, and PWM signals PWM1, PWM2 are processed in the controller

1100. The controller 1100 generates drive signals NG1_DRV and NG2_DRV, which are applied to the gates of switches S2 and S4 through buffers 1101 and 1103.

It should be noted that the embodiments shown in FIGS. 5-10 can be combined with the gate control circuit shown in FIG. 11. For example, the auxiliary coil shown in FIG. 10 may be employed in FIG. 11. In particular, the gates PG1 and PG2 may be connected to two terminals of an auxiliary coil.

Figure 12:
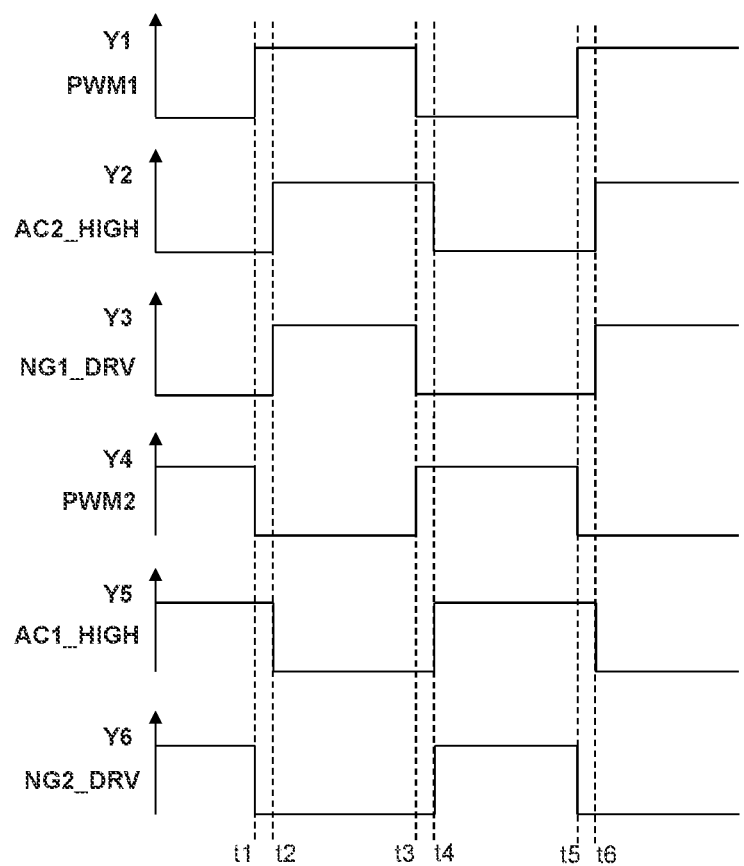
FIG. 12 is a gate control chart illustrating the operating principle of a first implementation of the gate control mechanism shown in FIG. 11 in accordance with various embodiments of the present disclosure.

FIG. 12 is a gate control chart illustrating the operating principle of a first implementation of the gate control mechanism shown in FIG. 11 in accordance with various embodiments of the present disclosure. The horizontal axis of FIG. 12 represents intervals of time. There are six vertical axes. The first vertical axis Y1 represents the gate drive signal PWM1 generated by the system controller. The second vertical axis Y2 represents the output signal AC2_HIGH of the second sensing device 1104. The third vertical axis Y3 represents the gate drive signal NG1_DRV, which is applied to the gate of the switch S2 through the first buffer 1101. The fourth vertical axis Y4 represents the gate drive signal PWM2 generated by the system controller. The fifth vertical axis Y5 represents the output signal AC1_HIGH of the first sensing device 1102. The sixth vertical axis Y6 represents the gate drive signal NG2_DRV, which is applied to the gate of the switch S4 through the second buffer 1103.

Prior to the time instant t1, NG1_DRV has a logic low state, and NG2_DRV has a logic high state. Switch S2 is turned off, and switch S4 is turned on. At t1, the gate drive signal PWM1 changes from a logic low state to a logic high state, and the gate drive signal PWM2 changes from a logic high state to a logic low state. Also at t1, the gate drive signal NG2_DRV changes from a logic high state to a logic low state in response to the falling edge of the gate drive signal PWM2. In response to the logic state change of NG2_DRV, the switch S4 is turned off, and the voltage at node AC2 increases accordingly during the time period from t1 to t2. At t2, the voltage at node AC2 is close to V1. The output signal AC2_HIGH of the second sensing device 1104 changes from a logic low state to a logic high state. The gate drive signal NG1_DRV is determined by signals PWM1 and AC2_HIGH. In particular, the gate drive signal NG1_DRV is determined by a result of an AND operation of PWM1 and AC2_HIGH. During the time period from t2 to t3, both PWM1 and AC2_HIGH have a logic high state. According to the operating principle of the AND operation, the gate drive signal NG1_DRV is of a logic high state from t2 to t3 as shown in FIG. 12.

At t3, the gate drive signal PWM1 changes from a logic high state to a logic low state, and the gate drive signal PWM2 changes from a logic low state to a logic high state. Also at t3, the gate drive signal NG1_DRV changes from a logic high state to a logic low state in response to the falling edge of the gate drive signal PWM1. In response to the logic state change of NG1_DRV, the switch S2 is turned off, and the voltage at node AC1 increases accordingly during the time period from t3 to t4. At t4, the voltage at node AC1 is close to V1. The output signal AC1_HIGH of the first sensing device 1102 changes from a logic low state to a logic high state. The gate drive signal NG2_DRV is determined by signals PWM2 and AC1_HIGH. In particular, the gate drive signal NG2_DRV is determined by a result of an AND operation of PWM2 and AC1_HIGH. During the time period from t4 to t5, both PWM2 and AC1_HIGH have a logic high state. According to the operating principle of the AND operation, the gate drive signal NG2_DRV is of a logic high state from t4 to t5.

During the time period from t5 to t6, the status of the gate drive signals is similar to that of the gate drive signals during the time period from t1 to t2, and hence is not discussed in detail again to avoid repetition.

Figure 13:
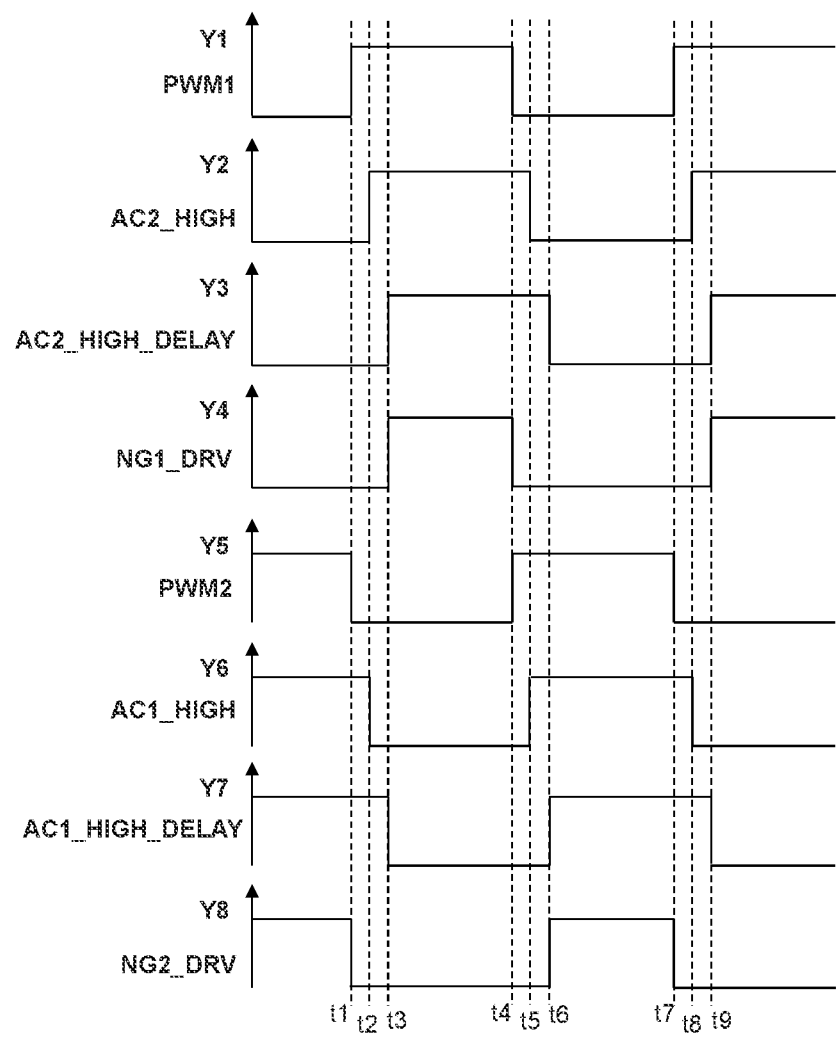
FIG. 13 is a gate control chart illustrating the operating principle of a second implementation of the gate control mechanism shown in FIG. 11 in accordance with various embodiments of the present disclosure.

FIG. 13 is a gate control chart illustrating the operating principle of a second implementation of the gate control mechanism shown in FIG. 11 in accordance with various embodiments of the present disclosure. The horizontal axis of FIG. 13 represents intervals of time. There are eight vertical axes. The first vertical axis Y1 represents the gate drive signal PWM1 generated by the system controller. The second vertical axis Y2 represents the output signal AC2_HIGH of the second sensing device 1104. The third vertical axis Y3 represents an AC2 rising/falling delay signal AC2_HIGH_DELAY. The fourth vertical axis Y4 represents the gate drive signal NG1_DRV, which is applied to the gate of the switch S2 through the first buffer 1101. The fifth vertical axis Y5 represents the gate drive signal PWM2 generated by the system controller. The sixth vertical axis Y6 represents the output signal AC1_HIGH of the first sensing device 1102. The seventh vertical axis Y7 represents an AC1 rising/falling delay signal AC1_HIGH_DELAY. The eighth vertical axis Y8 represents the gate drive signal NG2_DRV, which is applied to the gate of the switch S4 through the second buffer 1103.

The generation of gate drive signals NG1_DRV and NG2_DRV is similar to that shown in FIG. 12 except that the gate drive signal NG1_DRV is determined by an AND operation of the signals PWM1 and AC2_HIGH_DELAY, and the gate drive signal NG2_DRV is determined by an AND operation of the signals PWM2 and AC1_HIGH_DELAY. As shown in FIG. 13, the signal AC2_HIGH_DELAY is generated by adding a delay to the signal AC2_HIGH. Likewise, the signal AC1_HIGH_DELAY is generated by adding a delay to the signal AC1_HIGH.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
   a rectifier coupled to a coil of a wireless power transfer system, the rectifier comprising a first leg and a second leg, wherein:
   the first leg comprises a first switch and a second switch connected in series between a first voltage bus and a second voltage bus; and
   the second leg comprise a third switch and a fourth switch connected in series between the first voltage bus and the second voltage bus, and wherein a gate drive signal of the first switch is derived from a signal in phase with a voltage on a first terminal of the coil, and a gate drive signal of the third switch is derived from a signal in phase with a voltage on a second terminal of the coil; and an auxiliary coil magnetically loosely coupled to a transmitter coil of the wireless power transfer system, wherein the gate drive signal of the first switch is generated by a first terminal of the auxiliary coil through a first linear regulator, and the gate drive signal of the third switch is generated by a second terminal of the auxiliary coil through a second linear regulator, wherein:

a voltage on the first terminal of the auxiliary coil is in phase with the voltage on the first terminal of the coil;

a voltage on the second terminal of the auxiliary coil is in phase with the voltage on the second terminal of the coil;

the first linear regulator is a first p-type transistor connected between a gate of the first switch and the first terminal of the auxiliary coil, and wherein a gate of the first p-type transistor is connected to a predetermined voltage potential; and the second linear regulator is a second p-type transistor connected between a gate of the third switch and the second terminal of the auxiliary coil, and wherein a gate of the second p-type transistor is connected to the predetermined voltage potential.

2. The apparatus of claim 1, wherein:

a common node of the first switch and the second switch is coupled to the second terminal of the coil;

a common node of the third switch and the fourth switch is coupled to the first terminal of the coil, wherein the coil is a receiver coil;

the first voltage bus is coupled to a positive terminal of a load, wherein the rectifier is coupled between the receiver coil and the load; and the second voltage bus is coupled to ground.

3. The apparatus of claim 1, wherein:

a number of turns of the auxiliary coil is selected such that suitable gate drive voltages are applied to the gate of the first switch and the gate of the third switch, respectively.

4. The apparatus of claim 1, further comprising:

a resonant capacitor connected between the coil, and a common node of the third switch and the fourth switch.

5. A method comprising:

controlling a first high-side switch of an H-bridge using a first signal derived from a signal at a first terminal of an auxiliary coil through a first linear regulator, wherein a first midpoint and a second midpoint of the H-bridge are coupled to two terminals of a coil of a wireless power transfer system respectively, and the auxiliary coil is loosely coupled to a transmitter coil of the wireless power transfer system; and controlling a second high-side switch of the H-bridge using a second signal derived from a signal at a second terminal of the auxiliary coil through a second linear regulator, wherein:

a voltage on the first terminal of the auxiliary coil is in phase with a voltage on a first terminal of the coil;

a voltage on the second terminal of the auxiliary coil is in phase with a voltage on a second terminal of the coil;

the first linear regulator is a first p-type transistor connected between a gate of the first high-side switch and the first terminal of the auxiliary coil, and wherein a gate of the first p-type transistor is connected to a predetermined voltage potential; and the second linear regulator is a second p-type transistor connected between a gate of the second high-side switch and the second terminal of the auxiliary coil, and wherein a gate of the second p-type transistor is connected to the predetermined voltage potential.

* * * * *